United States Patent
Yang et al.

(10) Patent No.: US 7,128,199 B2
(45) Date of Patent: Oct. 31, 2006

(54) HOOKED DUST SCRAPER FOR BALL SCREW UNIT

(75) Inventors: Chuang-Pao Yang, Taichung (TW); Yan-Yu Chen, Taichung (TW)

(73) Assignee: HIWIN Technology Corp., Taichung (TW)

( * ) Notice: Subject to any disclaimer, the term of this patent is extended or adjusted under 35 U.S.C. 154(b) by 223 days.

(21) Appl. No.: 10/960,072

(22) Filed: Oct. 8, 2004

(65) Prior Publication Data

US 2006/0076214 A1  Apr. 13, 2006

(51) Int. Cl.
*B65G 29/00* (2006.01)

(52) U.S. Cl. ............... 198/468.9; 74/89.4; 277/354

(58) Field of Classification Search ............ 198/468.9, 198/468.8, 493, 670, 672; 277/354; 74/89.14, 74/89.4, 424.81, 458, 459
See application file for complete search history.

(56) References Cited

U.S. PATENT DOCUMENTS

| 4,407,511 | A | * | 10/1983 | Benton et al. | 277/354 |
| 4,905,533 | A | * | 3/1990 | Benton et al. | 74/89.4 |
| 5,029,877 | A | * | 7/1991 | Fedeli | 277/354 |
| 6,276,225 | B1 | * | 8/2001 | Takeda et al. | 74/424.82 |
| 6,571,653 | B1 | * | 6/2003 | Takeda et al. | 74/89.4 |
| 6,931,955 | B1 | * | 8/2005 | Yatsushiro et al. | 74/89.4 |

* cited by examiner

Primary Examiner—James R. Bidwell

(57) ABSTRACT

A hooked dust scraper for ball screw unit includes a plurality of tooth portions and corresponding number of hook portions. It is characterized that the scraper is hooked on the nut of the ball screw unit without employing screw engagement so that the ball screw unit associated with this scraper is easy to fabricate, assemble, and detach thereby saving the production and assembly cost.

6 Claims, 7 Drawing Sheets

US 7,128,199 B2

HOOKED DUST SCRAPER FOR BALL SCREW UNIT

BACKGROUND OF THE INVENTION

1. Field of the Invention

The present invention relates to an improved structure for a scraper to be used with the screw mechanism, in particular, a hooked dust scraper for ball screw unit to effectively prevent possible foreign materials such as dust, culls and adulterates from infringing into the spiral passage of the ball screw unit by removing them in advance ahead of the moving screw nut so as to protect the balls screw unit from excessive abrasion.

2. Description of the Prior Art

A screw mechanism has been applied in the mechanical engineering field for a long time. Basically the rotating motion of a screw bolt is converted to the linear motion of a nut so as to transmit a working piece. Among the existing screw mechanism the ball screw unit is the best efficient one because the traveling of the nut on the screw bolt is carried out by a plurality of balls rolling along the spiral grooves formed therebetween.

However, if the above mentioned foreign materials are stuck on the screw bolt, they might enter the passage of the rolling balls so as to retard the movement of the bolt or even seriously damage the ball screw unit by excessively abrasing the spiral grooves formed between the screw bolt and nut serving as a rolling passage for the balls. Therefore, installation of a scraper to remove the dust to clean the rolling passage is absolutely necessary.

A perspective view of conventional a scraper for a ball screw unit is shown in FIG. 10 in which a screw bolt 1 is couple with a nut 23. In this structure a scraper 60 is provided for equipping between the contact surface of the screw bolt 1 and the nut 23 at both ends of the nut 23. The scraper 60 is fixed to the nut 23 with a fixing screw 70 screwed into screw hole 231. The construction of the scraper 60 formed as such has to undergo a tedious and time consuming machining process by at first drill a screw hole 231 on the nut 23, then rotating the scraper 60 into the nut 23 on the bolt 1, then drill a hole on the scraper 60 at the positions corresponding to the screw hole 231 for screw combing the scraper 60 with the nut 23 by a fixing screw 70. During such tedious machining process, it is probability to happen the defective operations, for example, forgetting to apply one or two screws, piercing accidentally the screw bolt when drilling the screw hole, and unstable installation of the scraper due to its insufficient thickness, etc.

For these defects noticeable on the prior art, an improvement is seriously required.

The inventor has dedicated great efforts for years to studying and improving these defects and come up with a novel hooked dust scraper for ball screw unit as provided in this invention to eliminate the defects mentioned above.

SUMMARY OF THE INVENTION

Accordingly, the present invention is to provide a hooked dust scraper for ball screw unit, which can simplify the fabrication and assembly process so as to curtail the production cost by means of a screwless but just only a hook on structure.

The hooked dust scraper is the most effective one for removing the foreign materials such as dust, culls and adulterants sticking ahead of the passage of the ball screw unit whose operation relies on the rotation of rolling balls in a spiral groove to push the nut traveling onwards. By attaching the scraper at both incoming and outgoing ends of the ball screw unit to remove the aforesaid foreign materials, the ball screw unit can be operated smoothly and efficiently without the worry of damaging the unit due to excessive abrasion.

The main structure of the present invention includes a tooth portion and a hook portion respectively provided at inner and outer sides of the scraper. A plurality of pawls of the hook portion are arrayed along the outer edge of the scraper with a defined pitch such that when the scraper is squeezed beneath the nut of the ball screw unit the pawls may hook on the nut and travel along with the nut without slipping and leave the rest of unhooked pawls maintaining the compressed state thereby enhancing a close attachment of the scraper with screw bolt.

In the meanwhile, the pitch size of this gear shaped scraper determines the opened angle between two adjacent pawls, hence a proportional relation exists between the rotation angle of the scraper and the longitudinal linear displacement of the scraper along the screw bolt. In view of this, the present invention reserves a clearance between the pawls of the scraper and the adjacent screw bolt thread. The pitch of the screw bolt and the clearance are designed appropriately such that the longitudinal displacement of the scraper per revolution is less than this clearance thereby eliminating mutual interference between the scraper and the screw bolt during operation of the ball screw unit.

Furthermore, in the present invention, the two portions of the scraper is separately fabricated before assembling rather than integrally formed in one piece. With this structure, the scraper is widely applicable for variously sized ball screw unit having different threads sizes or different ball size by only replacing the improper tooth portion for the scraper.

Originally, the present invention provides a scraper only applicable for the ball screw unit with end cut through threaded groove. In order to make the scraper of the present invention applicable for the unit with none end cut through thread groove, an improvement is added to the present invention in which forming a slit on the circumference of the scraper by cutting a small part open thereof. When assembling, pull apart the two sides of the slit a little bit and squeeze the scraper into the spiral groove of the desired ball screw unit. In this manner the pawls are exerted by a small compressive clipping force from the slit which in turn serves to shrink the inner diameter of the scraper and further enhance the close attachment of the scraper to the screw bolt thereby upgrading the applicability and dust prevention effect of the present invention.

Besides, the tooth portion of the scraper according to the present invention is made of an oil immersed material so as to lubricate properly the ball screw unit when it is in use with this scraper.

BRIEF DESCRIPTION OF THE DRAWINGS

The above object and other advantages of the present invention will become more apparent by describing in detail the preferred embodiments of the present invention with reference to the attached drawings in which.

DETAILED DESCRIPTION OF THE PREFERRED EMBODIMENT

Figure 1:
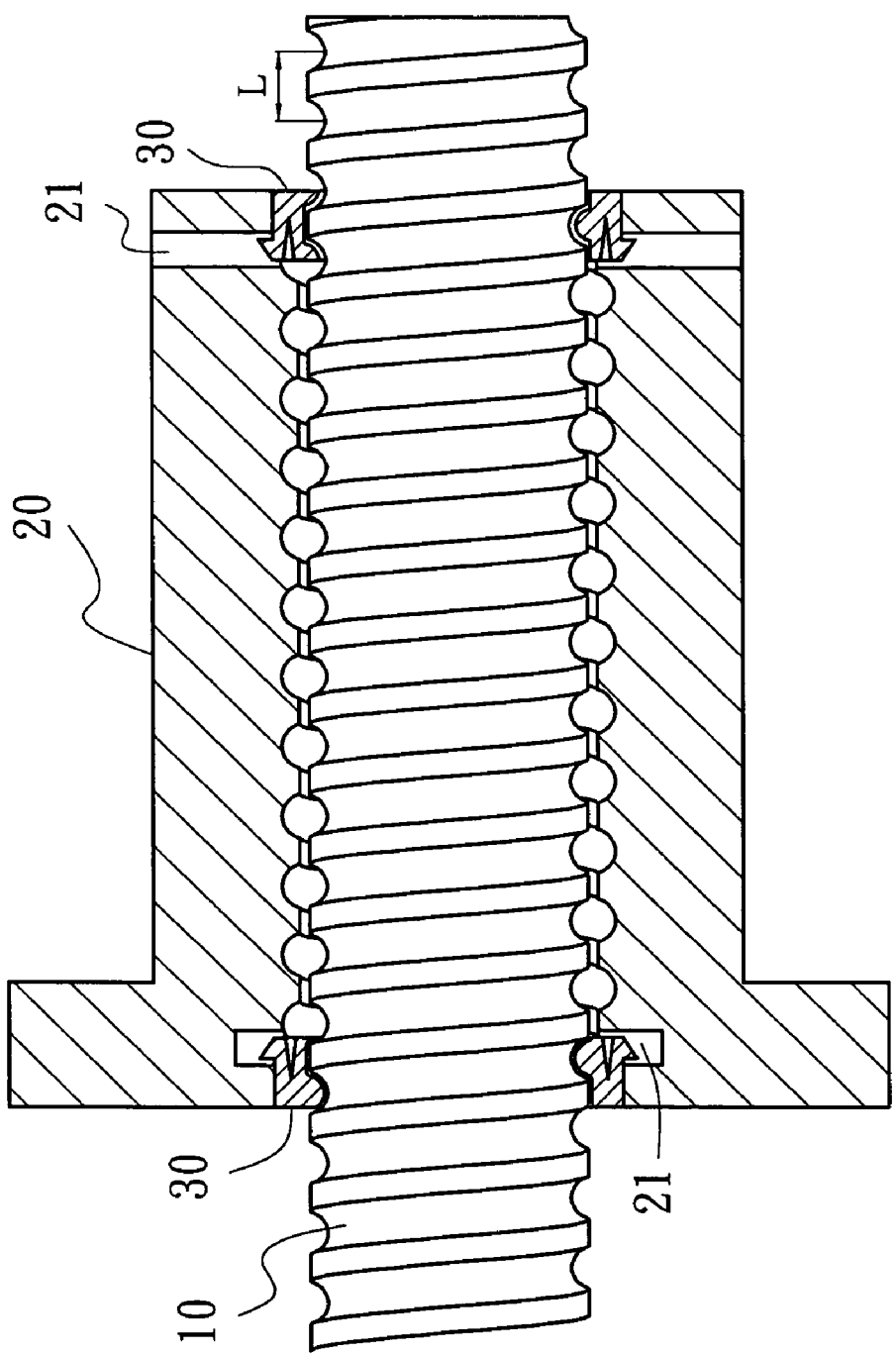
FIG. 1 is a cross sectional view of a ball screw unit equipped with the hooked dust scraper of the present invention.

Referring to FIG. 1 is a cross sectional view of a ball screw unit equipped with the scraper of the present invention. As shown in FIG. 1, a scraper 30 is attached to both ends of contact surface between a nut 20 and a screw bolt 10 with a lead L, retaining slots 21 are formed in the nut 20 at aforesaid both ends of contact surface by cutting so as to fasten the scraper 30 to the nut 20.

Figure 2:
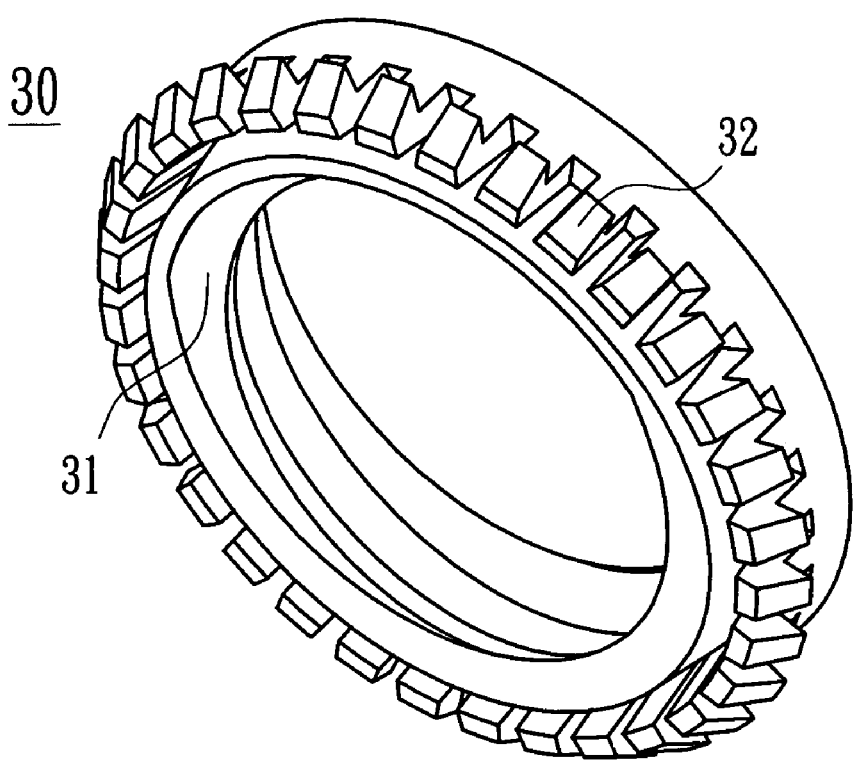
FIG. 2 is a perspective view of the present invention.
Figure 3:
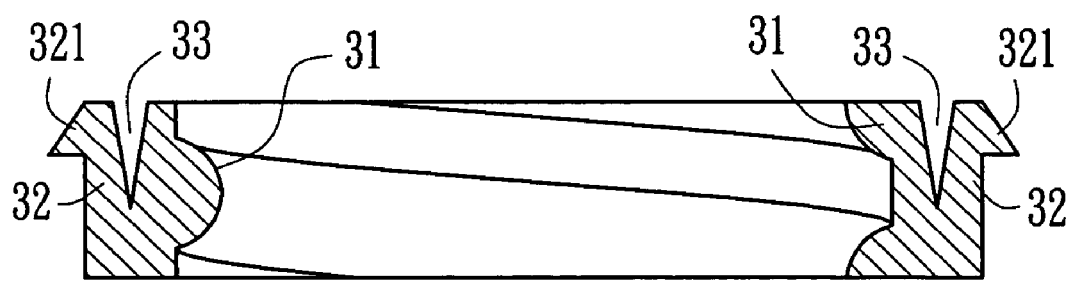
FIG. 3 is a cross sectional view of FIG. 2.

Referring to FIG. 2 and FIG. 3 which show a perspective and a cross sectional views of scraper according to the present invention respectively, the circular scraper 30 includes essentially a tooth portion 31 formed along its inner circumference and a hook portion 32 formed along its outer circumference. Each hook portion 32 has a plurality of pawls 321 protruded outwardly from the outer edge of the scraper 30, while the inner tooth portion 31 is in mesh with the thread of the screw bolt 10. A fissure 33 is formed between the tooth portion 31 and the hook portion 32 so that the pawls 321 can be squeezed beneath the nut 20 to engage with the retaining slot 21 following the movement of the nut 20. In order to facilitate the aforesaid squeezing action, the contact surface (not shown) between the pawls 321 and the nut 20 is made into a planar or curved one.

Figure 4:
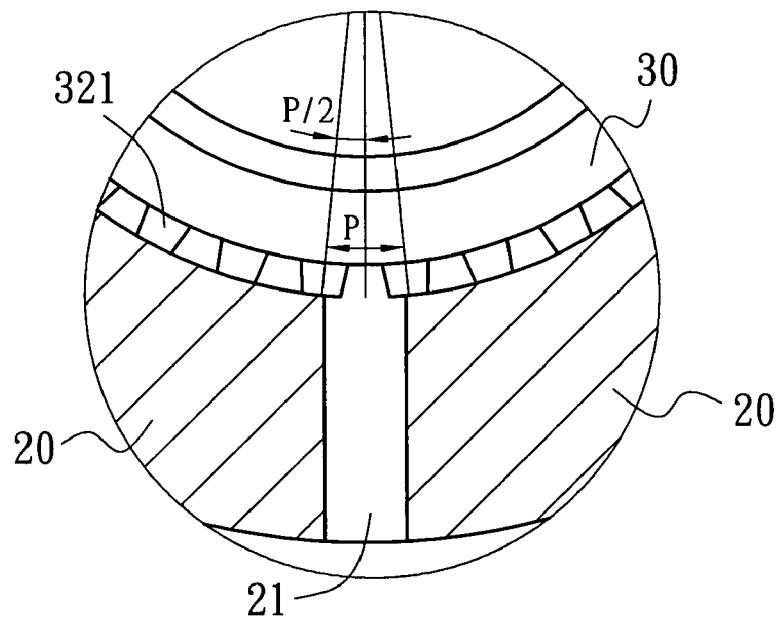
FIG. 4 is a partial side view of a ball screw unit equipped with the scraper of the present invention.
Figure 5:
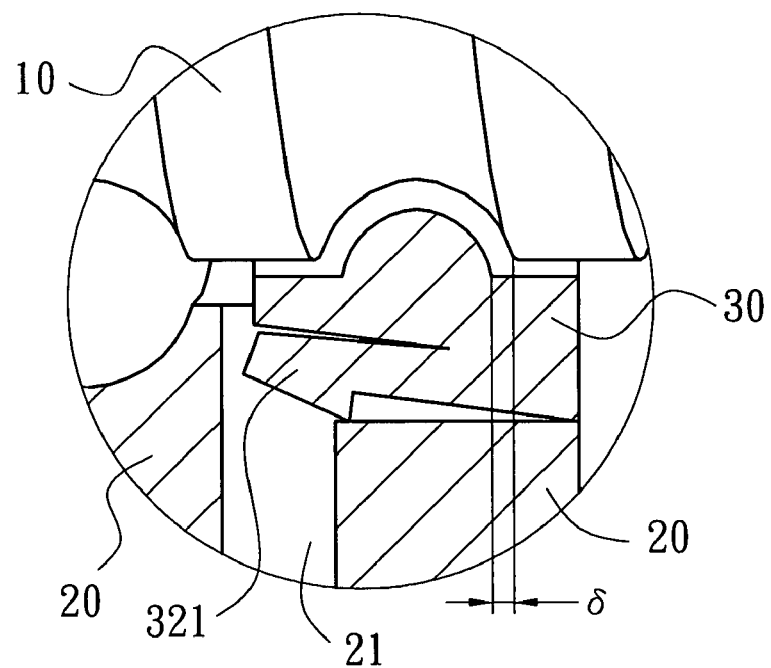
FIG. 5 is a partial front view of a ball screw unit equipped with the scraper of the present invention.

FIG. 4 and FIG. 5 are respectively a partial side view and a partial front view of a ball screw unit equipped with the scraper of the present invention. As shown in FIGS. 4 and 5, the pawls 321 are arrayed along the outer edge of the scraper 30 keeping a distance of P (pitch) apart from each other. When the scraper 30 is squeezed beneath the nut 20, the pawls 321 are shrunk towards its own center. In order to avoid mutual interference between the scraper 30 and the screw bolt 10 having the lead L, a clearance δ is reserved between the teeth of the tooth portion and the adjacent thread of the screw bolt 10. With this consideration, the pawls 321 may be easily squeezed into the corresponding retainer slot 21 and fastened closely to the nut 20 by reciprocally adjusting the pawls 321 within an angle of P/2 as shown in FIG. 4. In this way the scraper 30 is reliably attached to the nut 20 and travel onwards along with the nut 20 without slipping. The present invention further derives a preferable relationship between the pitch P and the clearance δ as: $P \leq 720° \cdot (\delta/L)$, wherein L is the lead of the screw bolt 10.

Figure 6:
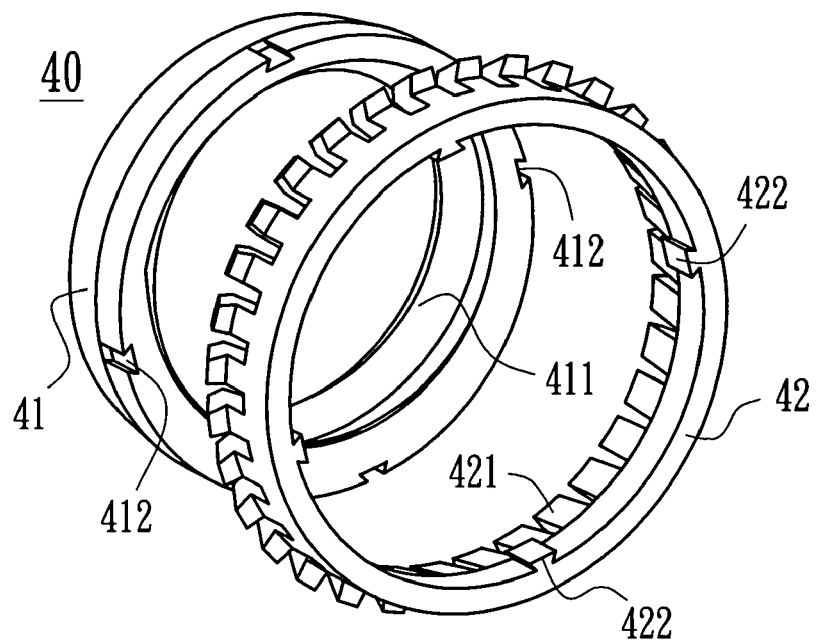
FIG. 6 and FIG. 7 are respectively the second and third embodiments.

FIG. 6 shows a second embodiment of the present invention. As shown in FIG. 6, tooth portions 41 and hook portions 42 are separately fabricated before assembling to form a unit scraper 40. Each tooth portion 41 has a tooth 411 to mesh the thread of the screw bolt 10 (not shown), and coupling slots 412 at the outer side to be engaged with the corresponding hook portion 42. The hook portion 42 is provided with a plurality of pawls 421 and keys 422 respectively on its outer and inner edges so as to couple with the coupling slots 412. With such a versatile design this two-part separately fabricated scraper is applicable universally for various sized ball screw unit by only selecting a suitable part of tooth portions 41 to meet a ball screw unit having a compatible thread pitch and ball size.

Figure 7:
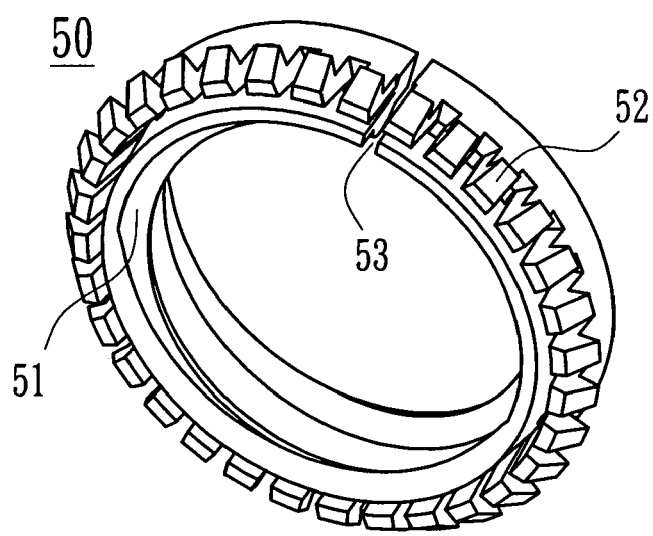

In a third embodiment of the present invention show in FIG. 7, a scraper 50 is also provided with tooth portions 51 and hook portions 52 respectively at its inner and outer sides. A slit 53 is formed at the circumference of the scraper 50 by cutting a small part open thereof. When assembling, the operator may pull apart the two sides of the slit 53 a little bit and squeeze the scraper 50 into the spiral groove of a desired ball screw unit. In this manner the pawls at the outer edge with being about to be squeezed are exerted by a small compressive clipping force of slit 53 which in turn serves to shrink the inner diameter of the scraper 50 and further enhance the close attachment of the scraper 50 to the screw bolt 10 thereby upgrading the applicability and dust preventing effect.

Figure 8C:
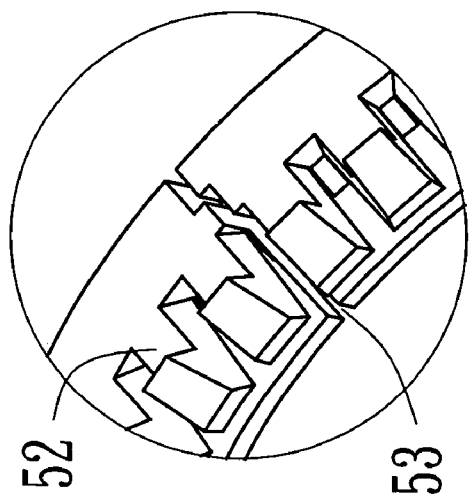
FIG. 8 is a schematic view showing various shaped slits provided with the scraper of the present invention.
Figure 8B:
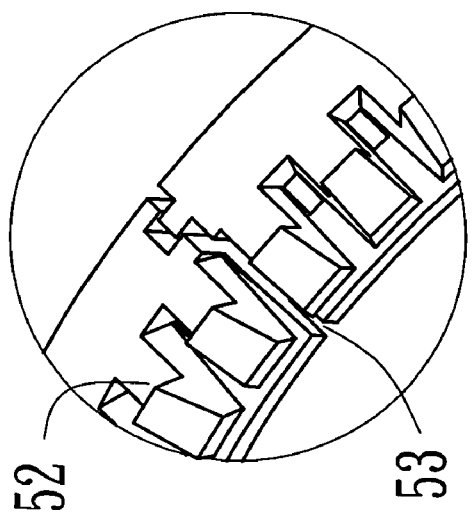
Figure 8A:
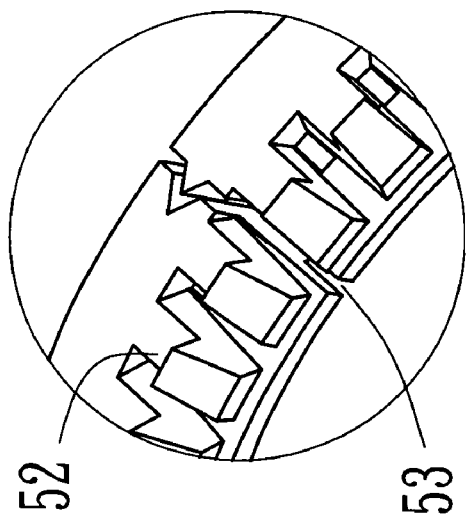
Figure 9C:
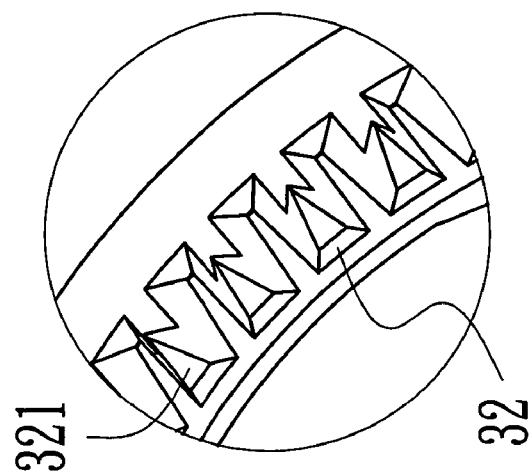
FIG. 9 is a schematic view showing various shaped pawls provided with the scraper of the present invention.
Figure 9B:
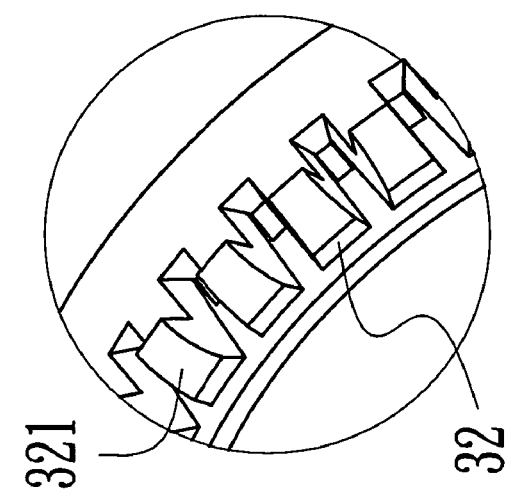
Figure 9A:
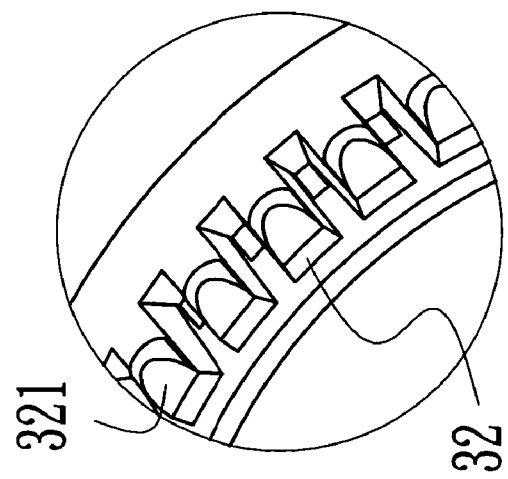
Figure 10:
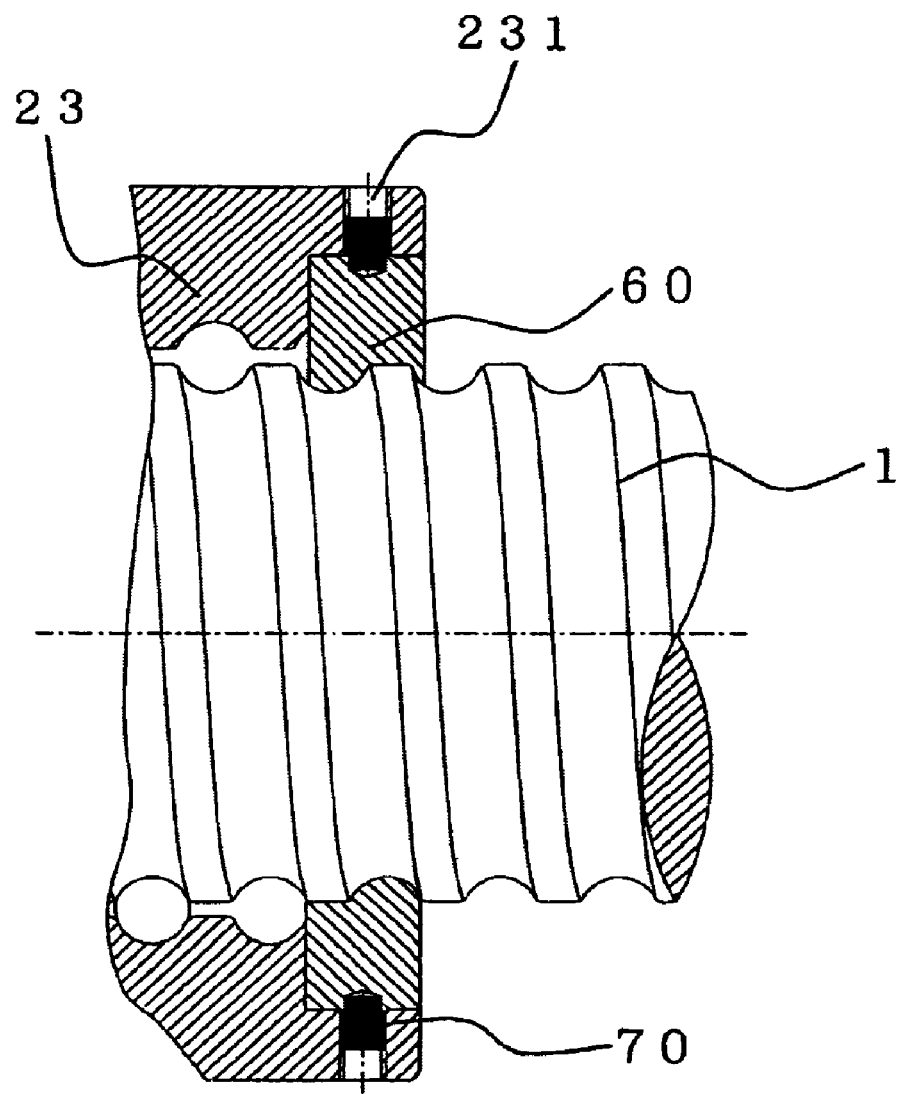
FIG. 10 is a cross sectional view of a ball screw unit equipped with a conventional dust scraper.

Various shaped slits provided with the scraper are shown in FIG. 8, and the various shaped pawls provided with the scraper are shown in FIG. 9. As shown in FIG. 8, the slits 53A, B, C are formed between the adjacent pawls of the hook portion 52 for providing the positioning effect for the scraper in different situations. As shown in FIG. 9, the head surface of the pawl 321 of the hook portion 32 is formed into a slanted semi-circular plane as in A, a slanted arcuate curved surface as in B, or a cone shaped plane as in C.

Besides, the tooth portions of the scraper are made of an oil immersed rubber material so as to lubricate properly the ball screw unit when it is in use with this scraper.

Although the description above contains many specificities, these should not be construed as limiting the scope of the invention but as merely providing illustration of some of the presently preferred embodiments of this invention. Thus the scope of the invention should be determined by the appended claims and their legal equivalents, rather than the examples given.

It should be emphasized that the present invention is a high level technical creation and by no means, simply utilizes conventional technology or know ledge known prior to the application for patent or can easily made by the persons skilled in the arts. Prior to the application for patent, the invention has neither been published or put to public use, nor displayed in an exhibition therefore the present invention is entitled for a patent.

What is claimed is:

1. A hooked dust scraper attached to each end of a contact surface between a nut and a screw bolt of a ball screw unit with a lead L, therein at least one retaining slot being formed in said nut at said contact surfaces, the hooked dust scraper comprising:

a tooth portion with a plurality of teeth formed in an inner circumference thereof in mesh with said screw bolt; and a hook portion with a plurality pawls formed in an outer circumference and protruded outwardly from an outer edge thereof;

wherein a fissure is formed between said tooth portion and said hook portion so that said pawls can be squeezed beneath said nut to engage with said retaining slot, and said pawls are arrayed along said outer edge keeping a pitch P, and a clearance δ is reserved between the teeth and the thread of said screw bolt with a relationship $P \leq 720° \cdot (\delta/L)$.

2. The scraper of claim 1, wherein said hook portion has unhooked pawls maintaining a compressed state so as to enhance close contact of said tooth portion with said ball screw unit.

3. The scraper of claim 1, wherein the contact surface between said pawls and said nut is slanted.

4. The scraper of claim 1, wherein a slit is formed on the circumference of said scraper.

5. The scraper of claim 1, wherein said tooth portion and said hook portion are separately fabricated before being assembled in one piece.

6. The scraper of claim 1, wherein said tooth portion is made of oil immersed material so as to properly lubricate said ball screw unit.

* * * * *